Nov. 10, 1925.

M. GOLDSTEIN

VEHICLE BUMPER

Filed April 7, 1925

1,561,155

Inventor,
Morris Goldstein,
by Geyer & Geyer
Attorneys.

Patented Nov. 10, 1925.

1,561,155

UNITED STATES PATENT OFFICE.

MORRIS GOLDSTEIN, OF BUFFALO, NEW YORK.

VEHICLE BUMPER.

Application filed April 7, 1925. Serial No. 21,296.

*To all whom it may concern:*

Be it known that I, MORRIS GOLDSTEIN, a citizen of the United States, residing at Buffalo, in the county of Erie and State of New York, have invented new and useful Improvements in Vehicle Bumpers, of which the following is a specification.

This invention relates to buffers or bumpers such as are used on automobiles and similar vehicles for protecting them against injury by collision.

One of its objects is to provide a bumper of this character which, while simple, strong and durable in construction, is so organized and arranged that it will effectually resist impact without danger of breakage to its parts.

Another object of the invention is to provide an inexpensive bumper which can be readily assembled and attached to the automobile frame.

In the accompanying drawings:—

Figure 1:
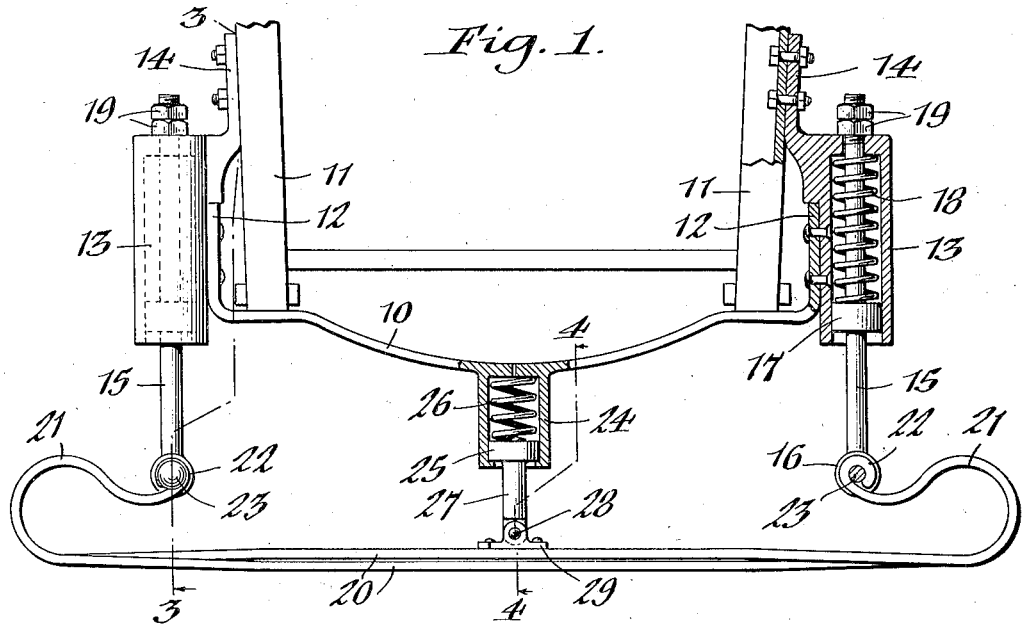
Figure 2:
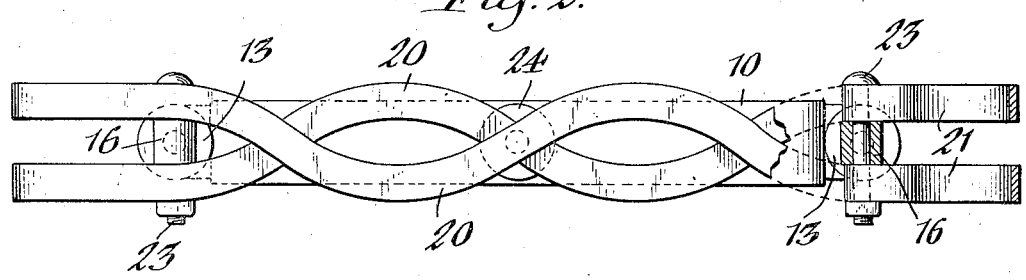
Figure 3:
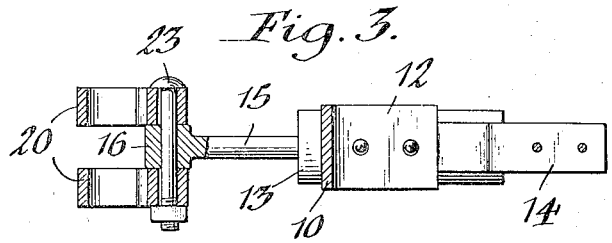
Figure 4:
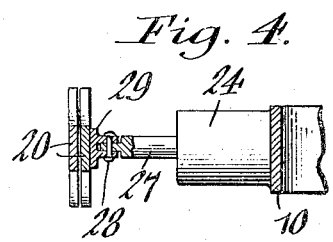

Figure 1 is a top plan view, partly in section, of the bumper in position on an automobile. Figure 2 is a front view thereof, partly in section. Figure 3 is a longitudinal section on line 3—3, Fig. 1. Figure 4 is a similar section on line 4—4, Fig. 1.

Similar characters of reference indicate corresponding parts throughout the several views.

In the preferred embodiment of the invention shown in the drawings, the same comprises a substantially U-shaped supporting frame or yoke consisting of a bowed or yieldable transverse portion 10 spanning and abutting against the front ends of the automobile frame-bars 11 and terminating at their opposite ends in rearwardly-bent flanges 12, 12, and housings 13, 13 secured to said flanges by riveting or otherwise and extending lengthwise of the vehicle between its frame and wheels, (not shown) and provided at their rear ends with attaching flanges or brackets 14, 14 for bolting the bumper supporting-frame to the vehicle.

Extending through the housings 13, 13 for yielding movement lengthwise thereof are horizontal bumper-supporting rods 15, which are provided at their front ends with eyes 16 and intermediate their ends with plungers 17 operable in the corresponding housings. Applied to each rod 15 is a coil spring 18 bearing at one end against the rear or closed end of the respective housing and at its opposite end against the plunger. These springs yieldingly resist rearward movement of the supporting rods, their forward movement being limited by stops in the form of nuts 19 applied to their rear ends and normally engaging the rear ends of said housings, as shown in Fig. 1.

The bumper proper, which is connected at its ends to the rods 15, preferably consists of a pair of impact bars 20, 20 of spring steel, which are disposed side by side and curved in a vertical plane relative to each other into substantially the shape of the figure 8, as shown in Fig. 2. The ends of these bars are parallel and spaced apart vertically, so that the end of one bar is arranged above the plane of the corresponding supporting-rod-eye 16 and its other end is below the plane of the companion supporting rod-eye. The parallel ends of the impact bars are curved rearwardly and inwardly to form resilient extensions or limbs 21 which terminate in loops 22 pivotally connected to the corresponding rod-eyes 16 by bolts 23.

Extending forwardly and centrally from the bowed portion 10 of the bumper supporting frame is a socket or housing 24 in which is contained a plunger 25 backed by a spring 26 or other cushioning medium to yieldingly resist the rearward movement of the same. A rod 27 projecting from the front end of this plunger is pivoted, as shown at 28, to a bracket 29 secured to the rear side of one of the bumper bars 20, as seen in Fig. 1.

By constructing a bumper in this manner, the action of the cushioning springs 18 and 26 is supplemented by the bowed transverse portion 10 of the supporting frame and by the curved rear extensions 21 of the impact bars, thereby effectually providing the bumper with the requisite resilient or yieldable qualities necessary to withstand the shock incident to collisions. Furthermore, by pivotally or hingedly connecting the intermediate and end portions of the bumper to the yieldable rods 27 and 15, respectively, the bumper is allowed to give laterally in one direction or the other, regardless of the relative angle of the blow or impact, without danger of breaking any of the associated parts. The curved arrangement of the impact bars into the shape of a figure 8 not only provides a very strong and durable construction, but adds materially to the design and appearance of the bumper.

I claim as my invention:—

1. A vehicle bumper, comprising a supporting frame adapted for attachment to the vehicle, an impact bar disposed forwardly of said frame, and terminating at its ends in resilient portions, and yieldable members mounted on and extending forwardly from said frame and pivotally connected at their front ends to the resilient portions of the impact bar.

2. A vehicle bumper, comprising a supporting frame adapted for attachment to the vehicle and having housings at its opposite sides, an impact bar disposed forwardly of said frame and terminating at its ends in rearwardly-bent resilient portions and rods yieldingly mounted in said housings and projecting forwardly therefrom, said rods being pivotally connected at their front ends to the resilient portions of the impact bar.

3. A vehicle bumper, comprising a supporting frame adapted for attachment to the vehicle and including a bowed, transverse portion, an impact bar disposed forwardly of said frame, and yieldable-supporting members applied to opposite ends of said frame and to its bowed portion and connected to the ends and intermediate portion of the impact bar, respectively.

4. A vehicle bumper, comprising a supporting frame adapted for attachment to the vehicle and including a bowed, transverse portion and housings arranged at the opposite ends of said bowed portion and extending lengthwise of the vehicle, an impact bar disposed forwardly of said frame and terminating at its ends in resilient portions, and cushioning devices applied to the frame-housings and to the bowed portion and pivotally connected to the resilient end portions and to the intermediate portion of the impact-bar, respectively.

5. A vehicle bumper, comprising an impact member consisting of two bars curved in a vertical plane into substantially the shape of the figure 8, the free ends of the bars being vertically-spaced and parallel and terminating in rearwardly-curved resilient portions, and cushioning devices adapted for attachment to the vehicle and pivotally connected at their ends to the resilient portions of said impact bars.

MORRIS GOLDSTEIN.